(12) United States Patent
Kanegae et al.

(10) Patent No.: US 11,230,245 B2
(45) Date of Patent: Jan. 25, 2022

(54) OCCUPANT PROTECTION DEVICE

(71) Applicant: SUBARU CORPORATION, Tokyo (JP)

(72) Inventors: Shota Kanegae, Tokyo (JP); Toru Yamashita, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 0 days.

(21) Appl. No.: 16/942,886

(22) Filed: Jul. 30, 2020

(65) Prior Publication Data

US 2021/0070243 A1 Mar. 11, 2021

(30) Foreign Application Priority Data

Sep. 5, 2019 (JP) .............................. JP2019-162446

(51) Int. Cl.
| | |
|---|---|
| *B60R 21/0134* | (2006.01) |
| *B60R 21/015* | (2006.01) |
| *B60R 21/207* | (2006.01) |
| *B60R 21/205* | (2011.01) |
| *B60R 21/231* | (2011.01) |
| *B60R 21/01* | (2006.01) |
| *B60R 21/16* | (2006.01) |
| *B60N 2/04* | (2006.01) |

(52) U.S. Cl.
CPC ............ *B60R 21/0134* (2013.01); *B60N 2/04* (2013.01); *B60R 21/01552* (2014.10); *B60R 21/205* (2013.01); *B60R 21/207* (2013.01); *B60R 21/231* (2013.01); *B60R 2021/01211* (2013.01); *B60R 2021/01286* (2013.01); *B60R 2021/161* (2013.01); *B60R 2021/23107* (2013.01)

(58) Field of Classification Search
None
See application file for complete search history.

(56) References Cited

U.S. PATENT DOCUMENTS 6,371,513 B1 * 4/2002 Fujimoto .......... B60R 21/01532
280/730.2
7,607,511 B2 * 10/2009 Sunabashiri .......... B60R 21/231
180/282

(Continued)

FOREIGN PATENT DOCUMENTS

| DE | 202004011849 U1 * | 12/2004 | ........... B60R 21/207 |
|---|---|---|---|
| JP | 11263186 A * | 9/1999 | |
| JP | 2018-052441 A | 4/2018 | |

*Primary Examiner* — Faye M Fleming
(74) *Attorney, Agent, or Firm* — Smith, Gambrell & Russell, LLP (57) ABSTRACT

An occupant protection device for a vehicle includes a collision predictor, a main airbag, a seat, a sub-airbag, and a deployment controller. The collision predictor is configured to predict a collision of the vehicle. The main airbag is configured to deploy toward an occupant from a front of the vehicle when a collision of the vehicle is predicted by the collision predictor. The seat allows the occupant to be seated, and is movable in a front-back direction of the vehicle. The sub-airbag is accommodated in an upper part of the seat, and configured to deploy downward from above the occupant. The deployment controller is configured to, when a collision of the vehicle is predicted by the collision predictor, cause the sub-airbag to deploy from the upper part of the seat and subsequently cause the main airbag to deploy.

16 Claims, 5 Drawing Sheets

(56) References Cited

U.S. PATENT DOCUMENTS

| | | | | |
|---|---|---|---|---|
| 9,056,592 B1* | 6/2015 | Kline | ................ | B60R 21/2072 |
| 10,407,015 B2* | 9/2019 | Belwafa | ............ | B60R 21/23138 |
| 2013/0184941 A1* | 7/2013 | Freienstein | ......... | B60R 21/0134 |
| | | | | 701/45 |
| 2020/0238937 A1* | 7/2020 | Saso | ..................... | B60N 2/643 |
| 2020/0238941 A1* | 7/2020 | Saso | .................... | B60R 21/205 |

* cited by examiner

OCCUPANT PROTECTION DEVICE

CROSS-REFERENCE TO RELATED APPLICATIONS

The present application claims priority from Japanese Patent Application No. 2019-162446 filed on Sep. 5, 2019, the entire contents of which are hereby incorporated by reference.

BACKGROUND

The disclosure relates to an occupant protection device.

To protect an occupant from a collision and so on, a vehicle, such as an automobile, is provided with an airbag device as an occupant protection device.

The airbag device is typically constituted by an impact sensor, an inflator, an airbag, a control device, and so on. In the airbag device, when the impact sensor detects the impact of, for example, a front collision, the impact sensor outputs a detection signal to the control device, the control device sends an activation signal to the inflator, and the inflator generates gas and sends the gas to the airbag. The airbag is instantaneously inflated with the gas sent from the inflator and deploys in front of the occupant. Accordingly, the airbag holds, with the gas pressure inside thereof, the body of the occupant moving forward due to the impact and deflates while absorbing the kinetic energy. Consequently, abrupt forward movement of the occupant caused by the impact exerted by, for example, the front collision of the automobile is slowed by the airbag, and the safety of the occupant is ensured.

Currently, autonomous driving technology is being studied. In a vehicle employing such autonomous driving, the travel state of the vehicle is controlled regardless of the intention of an occupant, such as the driver. Accordingly, an occupant protection device for such an autonomous driving vehicle is being proposed. This vehicle occupant protection device includes a front airbag that deploys in front of the upper body of the occupant. The front airbag has a shoulder-rest recess in a part with which the shoulder in the upper body of the occupant moving forward from the seating position comes into contact so that the shoulder fits in the shoulder-rest recess. Accordingly, even if the upper body of the occupant sitting in the seat moves forward from the seating position before a collision during autonomous driving of the vehicle, the shoulder in the upper body is supported by the shoulder-rest recess so as to protect the occupant. In the vehicle occupant protection device, the front airbag has an inclined surface that extends from the shoulder-rest recess toward one side in the vehicle width direction such that the inclined surface on the one side is located backward relative to the inclined surface on the other side. Accordingly, the entire upper body that moves forward in a diagonal posture in which the shoulder on the other side is located forward relative to the shoulder on the one side can be held and supported by the inclined surface of the front airbag, the entire upper body can be supported in a stable state, and the impact can be absorbed in this state (see Japanese Unexamined Patent Application Publication No. 2018-052441).

SUMMARY

An aspect of the disclosure provides an occupant protection device for a vehicle. The occupant protection device includes a collision predictor, a main airbag, a seat, a sub-airbag, and a deployment controller. The collision predictor is configured to predict a collision of the vehicle. The main airbag is configured to deploy toward an occupant from a front of the vehicle when a collision of the vehicle is predicted by the collision predictor. The seat allows the occupant to be seated, and is movable in a front-back direction of the vehicle. The sub-airbag is accommodated in an upper part of the seat, and configured to deploy downward from above the occupant. The deployment controller is configured, when a collision of the vehicle is predicted by the collision predictor, to cause the sub-airbag to deploy from the upper part of the seat and subsequently cause the main airbag to deploy.

An aspect of the disclosure provides an occupant protection device for a vehicle. The occupant protection device includes an occupant protection, a main airbag, a seat, a sub-airbag, and circuitry. The main airbag is configured to deploy toward an occupant from a front of the vehicle when a collision of the vehicle is predicted. The seat allows the occupant to be seated, and is movable in a front-back direction of the vehicle. The sub-airbag is accommodated in an upper part of the seat, and configured to deploy downward from above the occupant. The circuitry is configured to predict a collision of the vehicle. The circuitry is configured to, when a collision of the vehicle is predicted, cause the sub-airbag to deploy from the upper part of the seat and subsequently cause the main airbag to deploy.

BRIEF DESCRIPTION OF THE DRAWINGS

The accompanying drawings are included to provide a further understanding of the disclosure and are incorporated in and constitute a part of this specification. The drawings illustrate an example embodiment and, together with the specification, serve to explain the principles of the disclosure.

FIG. 3A to FIG. 3E are side views and illustrate the course of deployment of airbag bodies;

FIG. 5A to FIG. 5C are diagrams illustrating an example of the occupant protection device that causes a sub-airbag body to deploy from a seatback.

DETAILED DESCRIPTION

With the widespread and full-scale use of autonomous driving, the riding state of an occupant becomes more flexible. Accordingly, for example, even when the occupant is sitting in the driver's seat, the occupant may be holding a portable terminal or the like in their hand during traveling of the vehicle. Currently, an occupant sitting in a seat other than the driver's seat may be holding a portable terminal or the like in their hand during traveling of the vehicle.

In a case where an occupant is holding a portable terminal or the like when the front airbag deploys toward the occupant, the arm of the occupant or the portable terminal or the like is sandwiched between the front airbag and the upper body of the occupant, and it is difficult to provide appropriate occupant protection.

The present applicant has proposed a technique in which a sub-airbag is disposed in a roof and dropped from the roof to push the arm of an occupant downward. In this case, the position of the arm of the occupant is to be detected and the position to which the sub-airbag is to deploy is to be changed during a period from collision prediction to deployment of a main airbag (the front airbag in the related art). However, in order to appropriately protect the occupant at the time of a collision, the main airbag is to deploy instantaneously after the collision prediction, and the deployment position of the sub-airbag is to be changed in a limited time. Therefore, it is difficult to move the deployment position of the sub-airbag over a large distance. In particular, when the seat is moved by a seat sliding device in the front-back direction over a large distance, the position to which the sub-airbag is to deploy is to be changed to a large degree.

Accordingly, it is desirable to provide an occupant protection device that can provide appropriate occupant protection by causing a sub-airbag to instantaneously deploy to push the arm of the occupant away and causing a main airbag to deploy without delay even in a case where a collision is predicted while the occupant is holding a portable terminal or the like and where the seat is moved.

In the following, an embodiment of the disclosure is described in detail with reference to the accompanying drawings. Note that the following description is directed to an illustrative example of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiment which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description.

Figure 1:
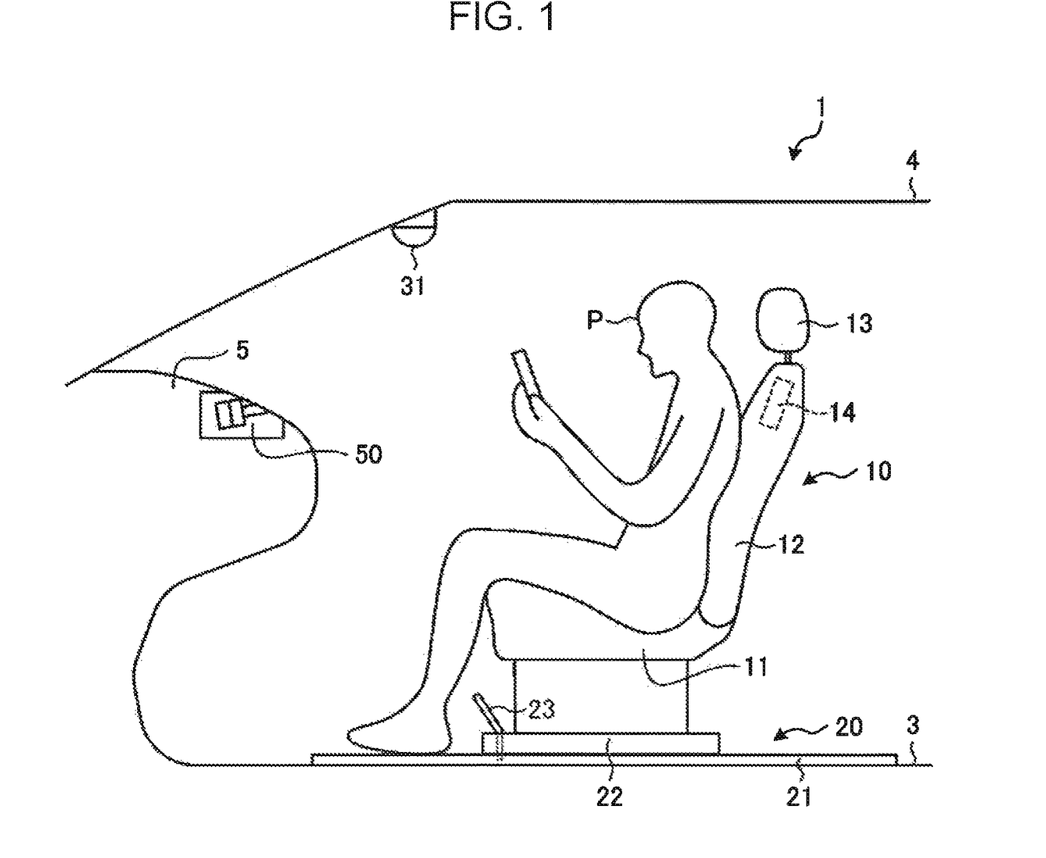
FIG. 1 is a cross-sectional view and illustrates part of a vehicle provided with an occupant protection device according to an embodiment of the disclosure.
Figure 2:
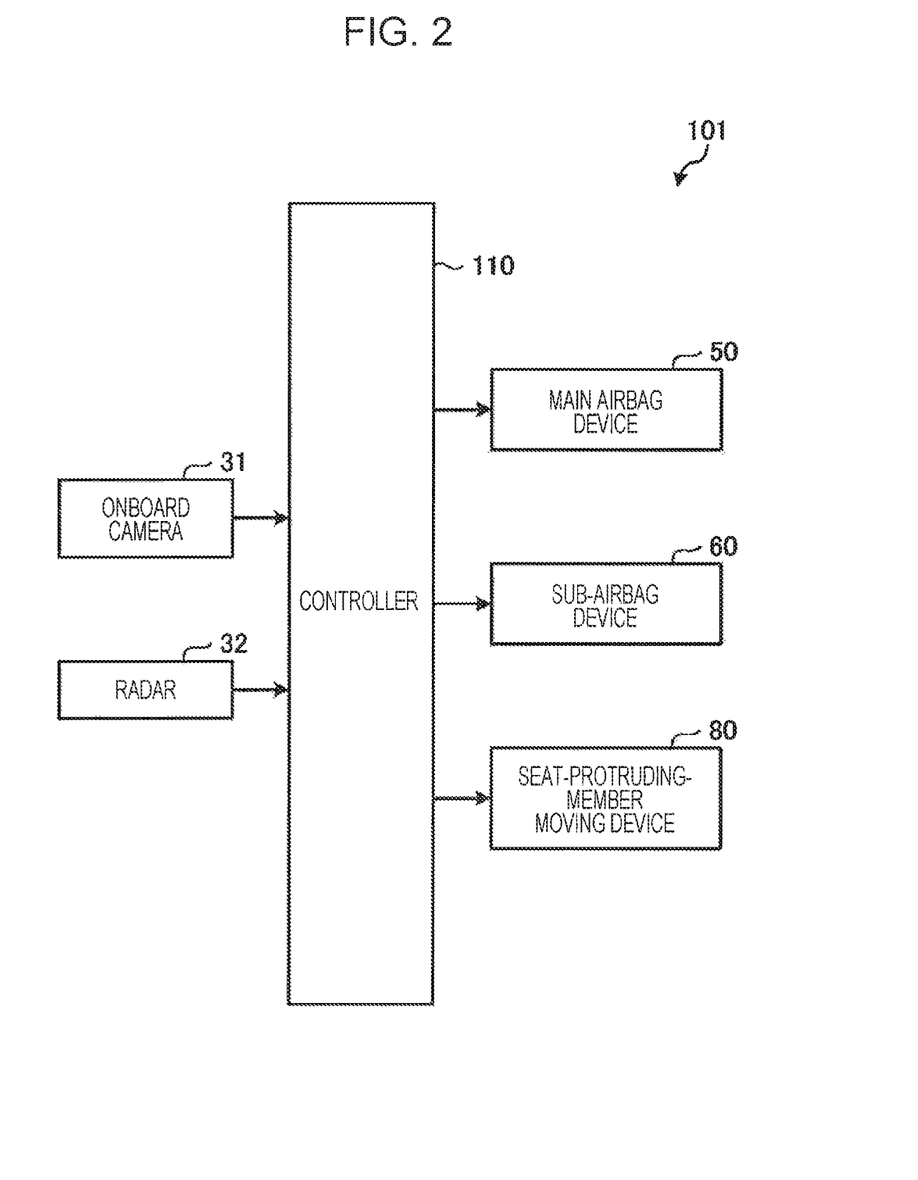
FIG. 2 is a schematic block diagram of the occupant protection device according to the embodiment of the disclosure.
Figure 3A:
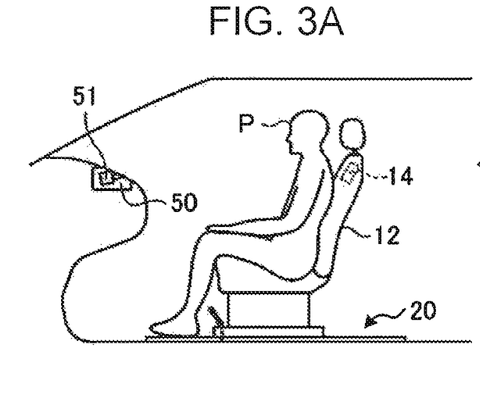
Figure 3B:
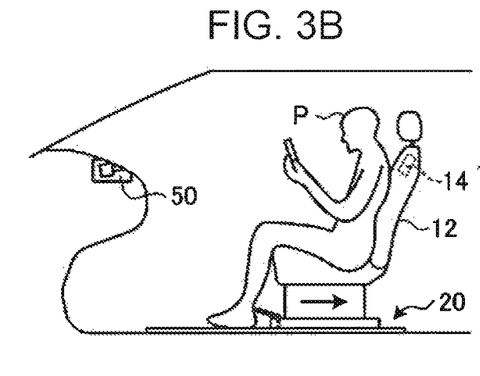
Figure 3C:
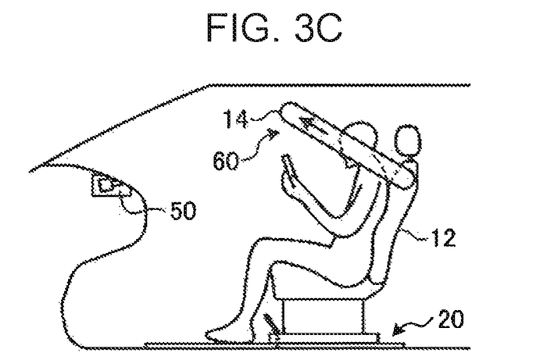
Figure 3D:
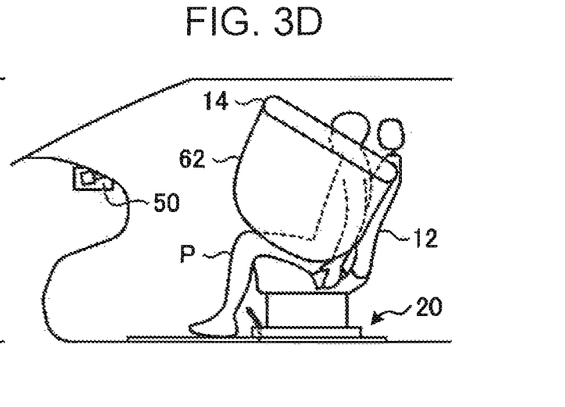
Figure 3E:
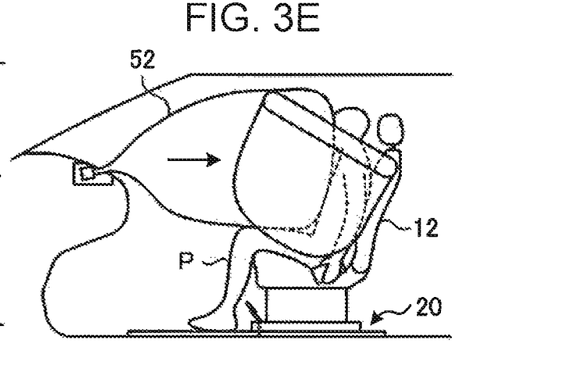
Figure 4:
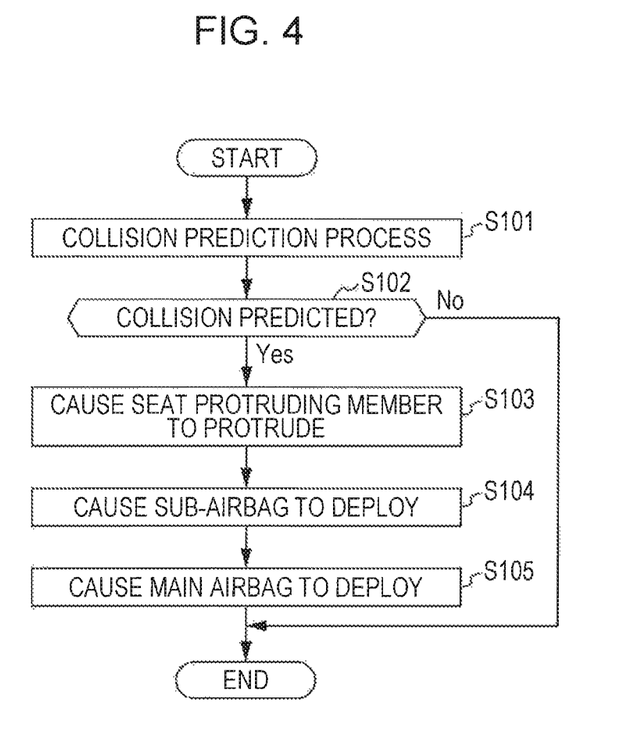
FIG. 4 is a flowchart illustrating overall operations of the occupant protection device.

FIG. 1 is a cross-sectional view and illustrates part of a vehicle provided with an occupant protection device according to an embodiment of the disclosure. FIG. 2 is a schematic block diagram of the occupant protection device according to the embodiment of the disclosure. FIG. 3A to FIG. 3E are side views and illustrate the course of deployment of airbag bodies when the occupant protection device according to this embodiment is activated. FIG. 4 is a flowchart illustrating overall operations of the occupant protection device.

Configuration of Vehicle 1

As illustrated in FIG. 1, in the occupant compartment of a vehicle 1, a floor 3 is provided in the lower part and a roof 4 is provided in the upper part. On the floor 3, a seat 10 is disposed. The vehicle 1 is further provided with an occupant protection device 101 described below.

Seat 10

The seat 10 is a seat for an occupant P to be seated while the occupant P is riding in the vehicle 1. The seat 10 includes a seat cushion 11 (seat) that supports the buttocks to the femoral region of the occupant P, a seatback 12 (backrest) that is provided so as to be reclinable, and a headrest 13 (head part) that supports the head of the occupant P.

In an inner upper part of the seatback 12, a seat protruding member 14 is provided. The seat protruding member 14 protrudes above the occupant P sitting in the seat 10 from the seatback 12 when a collision is predicted by a controller 110 described below. In a lower part of the seat protruding member 14, a sub-airbag device 60 described below is provided. The sub-airbag device 60 includes a sub-airbag body 62 described below, and the controller 110 causes the sub-airbag body 62 to deploy downward from above the occupant P when the seat protruding member 14 protrudes from the seatback 12.

Seat Sliding Device 20

For the seat 10, a seat sliding device 20 is provided. The seat sliding device 20 can adjust the front-back position of the seat 10 in accordance with an operation by the occupant P.

The seat sliding device 20 includes a lower rail 21, an upper rail 22, and an unlatching lever 23.

The lower rail 21 extends in the front-back direction of the vehicle 1 (hereinafter simply referred to as "front-back direction") and is fixed to the floor 3.

The upper rail 22 is installed so as to be movable in the front-back direction relative to the lower rail 21. For example, the upper rail 22 has a recess that extends in the front-back direction in a lower part thereof, and the recess fits with an upper part of the lower rail 21 to allow the upper rail 22 to slide in the front-back direction of the lower rail 21.

The lower rail 21 and the upper rail 22 are disposed on each side in the width direction of the vehicle 1 (hereinafter simply referred to as "width direction" or "right-left direction") as a pair. The seat 10 is fixed to the upper part of the upper rail 22. Accordingly, the seat 10 moves in the front-back direction as the upper rail 22 slides.

The unlatching lever 23 is provided for the upper rail 22 and is rotatably supported about a rotation axis. The lower end part of the unlatching lever 23 is inserted into part of the lower rail 21. Accordingly, movement of the upper rail 22 relative to the lower rail 21 is prohibited. The unlatching lever 23 can be rotated by, for example, operating the upper end part thereof, and the upper rail 22 and the lower rail 21 are unlatched from each other accordingly. That is, when the unlatching lever 23 is operated, the upper rail 22 is allowed to be moved forward and backward, and the seat 10 can be moved forward and backward.

Configuration of Occupant Protection Device 101

As illustrated in FIG. 2, the occupant protection device 101 includes an onboard camera 31, a radar 32, a main airbag device 50, the sub-airbag device 60, a seat-protruding-member moving device 80, and the controller 110. The main airbag device 50 is provided in a dashboard 5. The sub-airbag device 60 is provided in the seat 10 as described above.

As described below, the controller 110 has functions of an airbag deployment control unit (also called "airbag control unit" (ACU)) that detects a collision and collision prediction of the vehicle 1 on the basis of information input from the onboard camera 31 and the radar 32 and controls deployment of an airbag body provided in the main airbag device 50 and that provided in the sub-airbag device 60. The controller 110 may be provided as part of a vehicle control device (hereinafter referred to as "electronic control unit" (ECU)) that controls the vehicle 1 as a whole.

Onboard Camera 31

The onboard camera 31 is capable of capturing images of scenes outside and inside the vehicle 1. For example, the onboard camera 31 captures images of the environment around the vehicle 1, such as scenes ahead of, behind, and on the sides of the vehicle 1. Image information about the captured image is input to the controller 110, recorded to a random access memory (RAM) of the controller 110, and analyzed by the controller 110. Accordingly, the controller 110 can recognize the situation around the vehicle 1 (the situation outside the vehicle) in real time or in a follow-up manner.

Radar 32

The radar 32 emits a radio wave to detect an object, such as an obstacle, and measure the distance to and the direction of the object. The radar 32 is installed on the front bumper and the rear bumper of the vehicle 1 so as to enable, for example, front monitoring, side monitoring, and rear monitoring for the vehicle 1. Monitoring information is input to the controller 110, recorded to the RAM of the controller 110, and analyzed by the controller 110. Accordingly, the controller 110 can recognize the situation around the vehicle 1 in real time or in a follow-up manner.

In this embodiment, the onboard camera 31 and the radar 32 are provided, and information from both the onboard camera 31 and the radar 32 is used to predict a collision; however, this embodiment is not limited to this, and either one of the onboard camera 31 and the radar 32 may be used or another device may be used.

Main Airbag Device 50

The main airbag device 50 is controlled by the controller 110 to protect the occupant P from the impact of a collision. The main airbag device 50 includes a main inflator 51 and a main airbag body 52 (see FIG. 3A and FIG. 3E).

Main Inflator 51

The main inflator 51 ignites gunpowder in response to an activation signal based on collision detection or collision prediction of the vehicle 1 by the controller 110 to generate gas from a chemical reaction caused by burning. The gas generated by the main inflator 51 is injected into the main airbag body 52. The main inflator 51 receives the activation signal from the controller 110 later than a sub-inflator described below does.

Main Airbag Body 52

The main airbag body 52 is a bag body into which gas is injected by the main inflator 51. The main airbag body 52 is folded up small when not activated. When gas is injected from the main inflator 51, the main airbag body 52 inflates and deploys from the dashboard 5 toward the seat 10 to reduce the impact of the collision of the vehicle 1 on the head, chest, and so on of the occupant P. That is, when a collision of the vehicle 1 is predicted by the controller 110, the main airbag body 52 deploys from the front of the vehicle 1 toward the occupant P.

Sub-Airbag Device 60

The sub-airbag device 60 is controlled by the controller 110 to push the arm or hand of the occupant P downward. As described above, the sub-airbag device 60 is provided in the lower part of the seat protruding member 14 of the seat 10 and is retracted into the inner upper part of the seatback 12 together with the seat protruding member 14. At the time when a collision is detected, the sub-airbag device 60 is moved above the occupant P together with the seat protruding member 14 by the seat-protruding-member moving device 80 in accordance with control by the controller 110. The sub-airbag device 60 includes the sub-inflator (not illustrated) and the sub-airbag body 62.

Sub-Inflator

The sub-inflator ignites gunpowder in response to an activation signal based on collision detection or collision prediction of the vehicle 1 by the controller 110 to generate gas from a chemical reaction caused by burning. The gas generated by the sub-inflator is injected into the sub-airbag body 62. The sub-inflator receives the activation signal from the controller 110 earlier than the main inflator 51 does.

Sub-Airbag Body 62

The sub-airbag body 62 is a bag body into which gas is injected by the sub-inflator. The sub-airbag body 62 is folded up small when not activated. When gas is injected from the sub-inflator, the sub-airbag body 62 inflates and deploys downward from a certain position to which the sub-airbag device 60 is moved together with the seat protruding member 14 to push the arm or hand of the occupant P downward. That is, the sub-airbag body 62 deploys downward from above the occupant P.

Seat-Protruding-Member Moving Device 80

The seat-protruding-member moving device 80 is provided in the seat 10 and is controlled by the controller 110 to cause the seat protruding member 14 to protrude forward and slightly upward from the seatback 12.

In this embodiment, the seat protruding member 14 is caused to protrude straight from the seatback 12 forward and slightly upward; however, this embodiment is not limited to this. For example, the seat protruding member 14 may be moved to an upper part in the seatback 12 and caused to protrude forward from the upper part. The seat protruding member 14 may be moved to the upper part in the seatback 12, and subsequently caused to protrude forward and slightly upward or caused to protrude forward from the upper part in a curved manner.

Controller 110

The controller 110 controls operations of the occupant protection device 101. The controller 110 includes a central processing unit (CPU), a read-only memory (ROM) that stores a control program executed by the CPU, a data table, commands, data, and so on, the RAM that temporarily stores data, an electrically erasable and programmable read-only memory (EEPROM) formed of a rewritable non-volatile memory, and an input-output interface circuit. The controller 110 centrally controls the occupant protection device 101.

The controller 110 is coupled to the onboard camera 31, the radar 32, the main airbag device 50, the sub-airbag device 60, the seat-protruding-member moving device 80, and the ECU not illustrated via the input-output interface circuit.

The controller 110 performs collision prediction and collision determination for the vehicle 1 on the basis of information input from the onboard camera 31 and the radar 32.

An acceleration sensor (G sensor), a distance sensor, an impact sensor (pressure sensor), and the like may be used, and the controller 110 may perform collision prediction and collision determination on the basis of information input from these devices instead of the information input from the onboard camera 31 and the radar 32.

The controller 110 controls the seat-protruding-member moving device 80 to cause the seat protruding member 14 to protrude from the seatback 12. The controller 110 controls the sub-airbag device 60 to cause the sub-airbag body 62 to deploy. The controller 110 controls the main airbag device 50 to cause the main airbag body 52 to deploy.

When predicting a collision of the vehicle 1, the controller 110 causes the seat-protruding-member moving device 80 to cause the seat protruding member 14 to protrude from the seatback 12, causes the sub-airbag body 62 to deploy, and subsequently causes the main airbag body 52 to deploy.

Operations of Occupant Protection Device 101

Now, operations of the occupant protection device 101 thus configured are described.

FIG. 3A to FIG. 3E are side views and illustrate the course of deployment of airbag bodies (main airbag body 52 and sub-airbag body 62). FIG. 4 is a flowchart illustrating overall operations of the occupant protection device 101.

After climbing into the vehicle 1, the occupant P moves the seat 10 to a certain position using the seat sliding device 20. The sub-airbag device 60 is provided in the seatback 12. Therefore, at this time, the sub-airbag device 60 moves in the front-back direction together with the seat 10 while keeping a certain distance from the occupant P.

In the occupant protection device 101, a control process illustrated in FIG. 4 is regularly performed by the controller 110 at predetermined intervals.

In the control process, the controller 110 first performs a collision prediction process (step S101). For example, the controller 110 predicts a collision of the vehicle 1 on the basis of information input from the onboard camera 31 and the radar 32. In addition to this collision prediction, the controller 110 also performs a collision determination process for the vehicle 1. In a case where the controller 110 detects a collision of the vehicle 1, the controller 110 may perform a process similar to a process described below that is performed at the time when a collision is predicted; however, it is desirable to perform a process that is performed at the time of a collision. In the process that is performed at the time of a collision, for example, the controller 110 causes only the main airbag body 52 to deploy without causing the seat protruding member 14 to protrude or causing the sub-airbag body 62 to deploy.

Next, the controller 110 determines whether collision prediction of the vehicle 1 is detected (step S102). That is, the controller 110 determines whether a collision of the vehicle 1 is predicted in the collision prediction process.

In a case where the controller 110 determines that a collision is predicted (YES in step S102), the flow proceeds to step S103. In a case where the controller 110 determines that no collision is predicted (NO in step S102), the control process ends.

When detecting collision prediction of the vehicle 1, the controller 110 performs a process for causing the seat protruding member 14 to protrude from the seatback 12 (step S103). For example, the controller 110 controls the seat-protruding-member moving device 80 to cause the seat protruding member 14 to protrude forward and slightly upward from the seatback 12. As described above, the seat protruding member 14 may be moved to the upper part in the seatback 12, and thereafter, for example, caused to protrude forward or protrude forward and slightly upward. The sub-airbag device 60 is provided in the lower part of the seat protruding member 14, and therefore, is moved above the occupant P as the seat protruding member 14 protrudes.

Next, the controller 110 performs a process for causing the sub-airbag body 62 to deploy (step S104). For example, the controller 110 transmits an activation signal to the sub-inflator of the sub-airbag device 60 that is moved as the seat protruding member 14 protrudes to cause ignition to occur and to generate gas. In the sub-airbag device 60, when the sub-inflator generates gas, the gas is injected into the sub-airbag body 62, and the sub-airbag body 62 deploys downward toward the arm of the occupant P. Accordingly, the arm of the occupant P is pushed away by the deploying sub-airbag body 62.

The controller 110 may determine whether the arm of the occupant P is in the deployment area of the main airbag body 52 before causing the seat protruding member 14 to protrude, and in a case where the arm of the occupant P is not in the deployment area, the controller 110 might not cause the seat protruding member 14 to protrude or cause the sub-airbag body 62 to deploy.

Next, the controller 110 performs a process for causing the main airbag body 52 to deploy (step S105). For example, the controller 110 transmits an activation signal to the main inflator 51 of the main airbag device 50 to cause ignition to occur and to generate gas. In the main airbag device 50, when the main inflator 51 generates gas, the gas is injected into the main airbag body 52, and the main airbag body 52 deploys backward toward the upper body of the occupant P.

The seat protruding member 14 includes a left seat protruding member and a right seat protruding member respectively provided on the left and the right of the seatback 12, and the sub-airbag device 60 includes a left sub-airbag device and a right sub-airbag device respectively provided on the left and the right of the seatback 12.

At the time when a collision is predicted, the seat protruding member 14 and the sub-airbag device 60 on the left, on the right, or on both the left and the right are activated in accordance with control by the controller 110.

For example, when predicting a collision, the controller 110 determines on the basis of image information input from the onboard camera 31 whether, for example, the arms of the occupant P are in the deployment area of the main airbag body 52.

In a case where the left arm of the occupant P is in the deployment area of the main airbag body 52, the controller 110 causes the seat-protruding-member moving device 80 to cause the seat protruding member 14 on the left to protrude, and activates the sub-airbag device 60 on the left as the seat protruding member 14 on the left protrudes to cause the sub-airbag body 62 to deploy.

In a case where the right arm of the occupant P is in the deployment area of the main airbag body 52, the controller 110 causes the seat-protruding-member moving device 80 to cause the seat protruding member 14 on the right to protrude, and activates the sub-airbag device 60 on the right as the seat protruding member 14 on the right protrudes to cause the sub-airbag body 62 to deploy.

In a case where the both arms of the occupant P are in the deployment area of the main airbag body 52, the controller 110 causes the seat protruding member 14 on the left and the right to protrude to cause the sub-airbag body 62 on the left and the right to deploy.

As described above, in the occupant protection device 101 according to this embodiment, the sub-airbag device 60 is provided in the seat 10. Therefore, even when the seat 10 is moved by the seat sliding device 20, it is possible to cause the sub-airbag body 62 to deploy at the time when a collision is predicted without moving the sub-airbag device 60 to the position of the arm of the occupant P, and the occupant P can be appropriately protected. That is, even in a case where the occupant P is holding a portable terminal or the like, the arm is immediately removed from the deployment area of the main airbag body 52 by the sub-airbag body 62. Therefore, it is possible to cause the main airbag body 52 to immediately deploy after prediction of a collision without delay, and the occupant P can be appropriately protected without the arm of the occupant P being pressed against their upper body by the main airbag body 52.

In this embodiment, the sub-airbag device 60 is provided in the lower part of the seat protruding member 14, and the seat protruding member 14 is caused to protrude from the seatback 12 of the seat 10; however, the sub-airbag body 62 may be caused to deploy directly from the seatback 12.

Figure 5A:
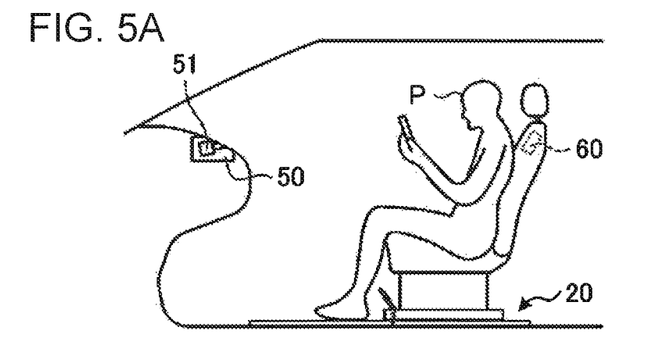
Figure 5B:
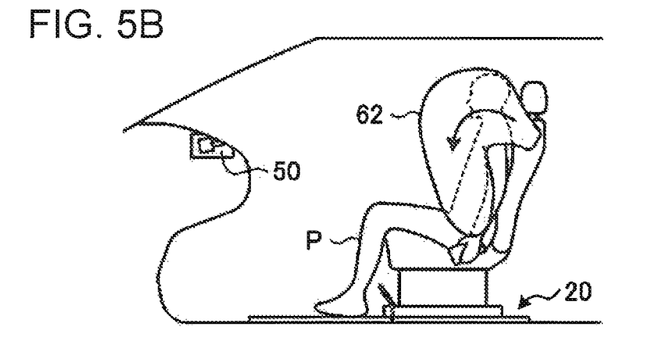
Figure 5C:
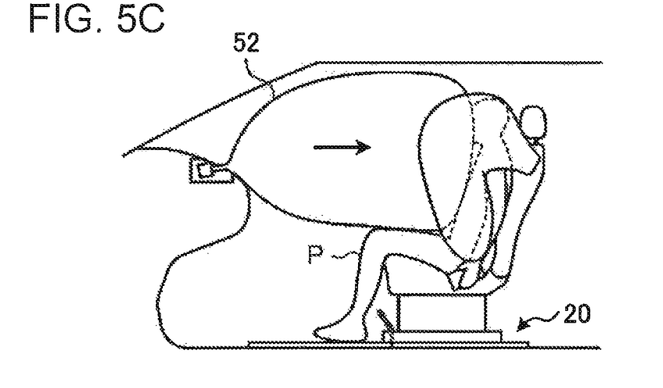

FIG. 5A to FIG. 5C are diagrams illustrating an example of the occupant protection device 101 that causes the sub-airbag body 62 to deploy from the seatback 12.

As illustrated in FIG. 5A to FIG. 5C, in the occupant protection device 101, the sub-airbag device 60 is provided in an upper part in the seatback 12 of the seat 10. The sub-airbag device 60 is disposed so as to start rushing out of the upper part of the seatback 12 slightly upward toward the front of the vehicle.

When predicting a collision, the controller 110 activates the sub-airbag device 60 to cause the sub-airbag body 62 to deploy. Accordingly, the sub-airbag body 62 directly rushes out of the seatback 12, deploys above the occupant P, and further deploys downward from above the occupant P.

In this case, the sub-airbag body 62 is shaped in a form and is accommodated in a position so that the sub-airbag body 62 deploys downward from above the occupant P. Accordingly, it is possible to cause the sub-airbag body 62 to rush out of the upper part of the seatback 12 upward toward the front of the vehicle 1 and subsequently cause the sub-airbag body 62 to deploy downward from above the occupant P.

In the occupant protection device 101 thus configured, the sub-airbag device 60 is provided in the seat 10, and therefore, it is also possible to cause the sub-airbag body 62 to immediately deploy even when the seat 10 is moved by the seat sliding device 20, and the occupant P can be appropriately protected without a delay in deployment of the main airbag body 52.

In one embodiment, the onboard camera 31 may serve as an occupant state detecting device. In the example, the seat protruding member 14 may serve as a "protruding member".

In one embodiment, the controller 110 may serve as a "collision predictor" and a "deployment controller".

In one embodiment, the main airbag body 52 may serve as a "main airbag". In one embodiment, the sub-airbag body 62 may serve as a "sub-airbag".

In one embodiment, the sub-airbag body 62 of the sub-airbag device 60 on the left may serve as a "left-arm sub-airbag". In the embodiment, the sub-airbag body 62 of the sub-airbag device 60 on the right may serve as a "right-arm sub-airbag".

In the embodiment, the seat 10 may serve as a "seat".

According to the embodiment of the disclosure, it is possible to provide an occupant protection device that can provide appropriate occupant protection by causing a sub-airbag to instantaneously deploy to push the arm of the occupant away and causing a main airbag to deploy without delay even in a case where a collision is predicted while the occupant is holding a portable terminal or the like and where the seat is moved.

The controller 110 illustrated in FIG. 2 can be implemented by circuitry including at least one semiconductor integrated circuit such as at least one processor (e.g., a central processing unit (CPU)), at least one application specific integrated circuit (ASIC), and/or at least one field programmable gate array (FPGA). At least one processor can be configured, by reading instructions from at least one machine readable tangible medium, to perform all or a part of functions of the controller 110. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the non-volatile memory may include a ROM and a NVRAM. The ASIC is an integrated circuit (IC) customized to perform, and the FPGA is an integrated circuit designed to be configured after manufacturing in order to perform, all or a part of the functions of the modules illustrated in FIG. 2.

The invention claimed is:

1. An occupant protection device for a vehicle, the occupant protection device comprising:
   a collision predictor configured to predict a collision of the vehicle;
   a main airbag configured to deploy toward an occupant from a front of the vehicle when a collision of the vehicle is predicted by the collision predictor;
   a seat allowing the occupant to be seated and having a seatback configured for accommodating a back of the occupant, the seat being movable in a front-back direction of the vehicle;
   a sub-airbag accommodated in an upper part of the seat, and configured to deploy downward from above the occupant, with the downward deployment including downward extension of a portion of the sub-airbag from a position that is above an uppermost point of the seatback; and
   a deployment controller configured to, when a collision of the vehicle is predicted by the collision predictor, cause the sub-airbag to deploy from the upper part of the seat and subsequently cause the main airbag to deploy.

2. An occupant protection device for a vehicle, the occupant protection device comprising:
   a collision predictor configured to predict a collision of the vehicle;
   a main airbag configured to deploy toward an occupant from a front of the vehicle when a collision of the vehicle is predicted by the collision predictor;
   a seat allowing the occupant to be seated, and movable in a front-back direction of the vehicle;
   a sub-airbag accommodated in an upper part of the seat, and configured to deploy downward from above the occupant; and
   a deployment controller configured to, when a collision of the vehicle is predicted by the collision predictor, cause the sub-airbag to deploy from the upper part of the seat and subsequently cause the main airbag to deploy, and
   a protruding member accommodating the sub-airbag and configured to protrude above the occupant from the upper part of the seat, wherein
   the deployment controller is configured to cause the protruding member to protrude from the seat to cause the sub-airbag to deploy from the protruding member when a collision of the vehicle is predicted by the collision predictor.

3. The occupant protection device for a vehicle according to claim 1, further comprising
   an occupant state detecting device configured to detect a position of an arm of the occupant, wherein
   the deployment controller is configured to cause the sub-airbag to deploy on a basis of the position of the arm of the occupant detected by the occupant state detecting device.

4. The occupant protection device for a vehicle according to claim 2, further comprising
   an occupant state detecting device configured to detect a position of an arm of the occupant, wherein
   the deployment controller is configured to cause the sub-airbag to deploy on a basis of the position of the arm of the occupant detected by the occupant state detecting device.

5. The occupant protection device for a vehicle according to claim 3, wherein the sub-airbag comprises a right-arm sub-airbag and a left-arm sub-airbag, and the deployment controller is configured to cause the right-arm sub-airbag or the left-arm sub-airbag to deploy on the basis of the position of the arm of the occupant detected by the occupant state detecting device.

6. The occupant protection device for a vehicle according to claim 4, wherein the sub-airbag comprises a right-arm sub-airbag and a left-arm sub-airbag, and the deployment controller is configured to cause the right-arm sub-airbag or the left-arm sub-airbag to deploy on the basis of the position of the arm of the occupant detected by the occupant state detecting device.

7. An occupant protection device for a vehicle, the occupant protection device comprising:

a main airbag configured to deploy toward an occupant from a front of the vehicle when a collision of the vehicle is predicted;

a seat allowing the occupant to be seated and having a seatback configured for accommodating a back of the occupant, and movable in a front-back direction of the vehicle;

a sub-airbag accommodated in an upper part of the seat, and configured to deploy downward from above the occupant, with the downward deployment including downward extension of a portion of the sub-airbag from a position that is above an uppermost point of the seatback; and circuitry configured to predict a collision of the vehicle, and when a collision of the vehicle is predicted, cause the sub-airbag to deploy from the upper part of the seat and subsequently cause the main airbag to deploy.

8. The occupant protection device for a vehicle according to claim 1, wherein the sub-airbag is accommodated in an upper part of the seatback.

9. The occupant protection device for a vehicle according to claim 1, wherein the sub-airbag is configured as to deploy upward prior to deploying downward.

10. The occupant protection device for a vehicle according to claim 1, wherein the seat includes a head-rest and the sub-airbag is configured to be positioned at a height of the headrest.

11. The occupant protection device for a vehicle according to claim 1, wherein the deployment controller is configured to send a deployment activation signal to the sub-airbag prior to sending a deployment activation signal to the main airbag.

12. The occupant protection device for a vehicle according to claim 7, wherein the sub-airbag is accommodated in an upper part of the seatback.

13. The occupant protection device for a vehicle according to claim 7, wherein the sub-airbag is configured as to deploy upward prior to deploying downward.

14. The occupant protection device for a vehicle according to claim 7, wherein the circuitry is configured to send a deployment activation signal to the sub-airbag prior to sending a deployment activation signal to the main airbag.

15. The occupant protection device for a vehicle according to claim 1, further comprising a protruding member accommodating the sub-airbag and configured to protrude above the occupant from the upper part of the seat, wherein the deployment controller is configured to cause the protruding member to protrude from the seat to cause the sub-airbag to deploy from the protruding member when a collision of the vehicle is predicted by the collision predictor.

16. The occupant protection device for a vehicle according to claim 7, further comprising a protruding member accommodating the sub-airbag and configured to protrude above the occupant from the upper part of the seat, and wherein the circuitry is configured to cause the protruding member to protrude from the seat to cause the sub-airbag to deploy from the protruding member when a collision of the vehicle is predicted by the collision predictor.

* * * * *